United States Patent [19]

Wiig

[11] 4,440,832

[45] Apr. 3, 1984

[54] METHOD AND MATERIAL FOR PREPARING A SURFACE FOR WINTER SPORTS

[76] Inventor: Erling O. Wiig, 60 Amigo La., Walnut Creek, Calif. 94596

[21] Appl. No.: 103,527

[22] Filed: Dec. 14, 1979

Related U.S. Application Data

[63] Continuation of Ser. No. 941,778, Sep. 13, 1978, abandoned.

[51] Int. Cl.$^3$ ............................................. B05D 5/00
[52] U.S. Cl. .................................... 428/405; 427/180; 427/202; 427/203; 428/447; 252/11; 272/56.5 SS; 272/97
[58] Field of Search ................... 272/56.5 SS, 97; 427/180, 202, 203, 335, 445, 221; 428/405, 447; 252/11

[56] References Cited

U.S. PATENT DOCUMENTS

| | | | |
|---|---|---|---|
| 3,291,486 | 12/1966 | Applegath et al. | 272/56.5 SS |
| 3,443,492 | 5/1969 | Pleass | 272/56.5 SS |
| 3,508,945 | 4/1970 | Haemer et al. | 272/56.5 SS |
| 3,570,846 | 3/1971 | Weber et al. | 272/56.5 SS |
| 3,736,847 | 6/1973 | Hickey | 272/56.5 SS |

*Primary Examiner*—Shrive P. Beck
*Attorney, Agent, or Firm*—Phillips, Moore, Lempio & Finley

[57] ABSTRACT

A method is disclosed for preparing a surface for winter sports such as skiing, tobagganing, or sledding. The method includes laying down a first layer of relatively large sodium chloride crystals and permitting these crystals to absorb moisture. A second layer of sodium chloride crystals along with an anti-friction agent is placed atop the first layer after a predetermined period of time. Also disclosed is a material suitable for practicing the method.

12 Claims, No Drawings

METHOD AND MATERIAL FOR PREPARING A SURFACE FOR WINTER SPORTS

This is a continuation of Ser. No. 941,778, filed Sept. 13, 1978 now abandoned.

BACKGROUND OF THE INVENTION

This invention relates to a method for providing a surface upon which winter sports may be performed. In particular, the invention relates to preparing a surface for skiing or the like.

Winter sports have become extremely popular in recent years. Unfortunately, the natural surface upon which winter sports are normally performed is available only in the colder months of the year. Further, it is limited to those areas in which snowfall regularly occurs. In the case of skiing, normally the more mountainous regions are the only appropriate ski areas. In recent years, with the advent of cross-country skiing, relatively level areas have been found to be appropriate for skiing. Nevertheless, the skier must wait for adequate snowfall to practice his sport.

Over the years, numerous attempts have been made to provide surfaces upon which skiing, tobagganing or sledding may take place without the normal snowfall. The earliest versions of such artificially produced snow usually involved shaved ice or the like. This method is still in common use even in some ski areas. The general procedure is to provide a large amount of ice, usually in block form, which is shaved and then blown on to a surface. It is immediately evident that the use of shaved ice is limited from a practical standpoint to the colder months of the year. To place shaved ice on a sunny slope in summer months would be economically wasteful. Furthermore, the use of shaved ice in demonstrations which are held within buildings require adequate drainage to channel the melt away from the floor areas of the building.

In more recent years, other surfaces have come into use. One common surface found today is a coarse rug-like surface in which particles are located. These particles may be of a plastic material which provides the skier with the illusion of "corn" snow. In some cases, the particulate matter may be of a slippery material thus enhancing the surface for relatively high speed skiing. A major drawback of surfaces having plastic particulate matter of the like described herein is the accumulation of the particulate matter in the non-used areas. This may be attributable to the light weight or low density of the plastic. For example, on a slope, the particulate matter is carried to the bottom of the slope. After several skiers have used the slope, the particulate matter must be carried up the slope and raked into the surface for continued use. A second drawback is the lack of portability of such a structure. The rug-like surface must be removed and shipped to the new demonstration area while the particulate matter must be gathered and placed in appropriate bags for shipping also. Although these steps are feasible, shipping can become cumbersome. Finally, the particulate matter tends to break down because of its relative softness.

It has been determined that a surface for skiing is more pleasing to the eye if it looks like snow. Thus, the rug or carpet like approach just described, unless made of a white material, suffers an aesthetic drawback since such surfaces generally have a darker color to avoid the necessity of constant cleaning.

Accordingly, this invention overcomes the drawbacks set forth above while providing an aesthetically pleasing surface for the would-be summer skier.

SUMMARY OF THE INVENTION

This invention overcomes one or more of the disadvantages of other surfaces utilized for artificial skiing.

Specifically, the invention is a method of preparing a surface for winter sports which comprises the following steps. A quantity of salt crystals is provided along with an anti-friction agent. The two materials are then laid down in a layer of salt crystals and the anti-friction agent.

DETAILED DESCRIPTION OF THE PREFERRED METHOD

In practicing the preferred method of this invention, it is assumed that a surface is available for the application of the material. In view of the nature of the material used, it is appropriate to utilize a wooden structure with a curbing similar to the structures utilized for application of shaved ice. Since the method may be practiced both indoors and outdoors, it might be appropriate to provide a cement undersurface to prevent excessive mixture of the material used herein with the soil.

Initially, a supply of relatively large crystals such as crystalline sodium chloride are laid down in a 2-3" (50.8-76.2 mm) layer upon the surface to be utilized for winter sports. Although other crystals may be found useful, the method envisions the use of a salt crystal, particularly sodium chloride. Preferably, the sodium chloride crystals should be kiln-dried. Furthermore, this initial layer of sodium chloride crystals preferably should be made up of relatively large crystals such that they would not pass through a quarter inch (6.350 mm) mesh screen. Neither the kiln-drying limitation nor the crystal size are limiting; however, practice has shown better surfaces may be prepared utilizing sodium chloride crystals meeting these specifications.

The first layer as described above should be left to stand on the surface for a predetermined period. Three days has been found adequate although under certain atmospheric conditions, this period will vary. The purpose of the material staying is to absorb ambient moisture from the air. The ambient moisture thus absorbed serves to "cement" the crystals into a relatively solid sheet covering the surface. It should be apparent to those skilled in the art that the use of kiln-dried sodium chloride ("rock-salt") will enhance the absorption of ambient moisture. Thus the process of permitting the layer of relatively large crystals to remain in the atmosphere for upwards of three days may, in some cases, be shortened.

Once the surface becomes relatively solid due to remaining in the atmosphere, a second layer of sodium chloride crystals of 2-3" (50.8-76.2 mm) is placed on top of the first layer. With the second layer of sodium chloride crystals, an anti-friction agent is combined. One such anti-friction agent is an aqueous solution of dimethyl silicone. Such a material is available as a water emulsion which may be further diluted, is sold under the tradename "36 Emulsion" and is manufactured by Dow Corning Corporation of Midland, Mich. Dimethyl silicone fluids are known to be useful as mold release agents in the plastics and rubber industry.

The second layer of sodium chloride crystals should be relatively smaller than the first layer, preferably these crystals should not pass through a $\frac{1}{8}$" (3.175 mm)

mesh screen. Again, the second layer of sodium chloride crystals preferably is kiln-dried for a purpose to be explained.

The application of the anti-friction agent to the second layer of sodium chloride crystals may be by one of two methods. In the first method, the smaller sodium chloride crystals are placed on the surface and the agent is sprayed thereupon. The particular silicone anti-friction agent utilized may be applied as it comes from the supplier or may be diluted in ratios of up to one part emulsion to ten parts water. Experience has shown that several applications at intervals of four to six hours is appropriate when practicing this variation of this invention. The quantity of the anti-friction agent should be limited to prevent excessive dissolving of the sodium chloride crystals. Agitation or mixing of the sodium chloride should take place during spraying to enhance absorption of the anti-friction agent.

In this embodiment of the invention, it may also be appropriate to lay down several layers of the smaller sodium chloride crystals with application of the anti-friction agent occurring several times between each layer of the smaller sodium chloride crystals.

In use, the resulting material provides a relatively frictionless snow colored surface upon which winter sports such as skiing, tobogganing, sledding and the like may occur, the use of a larger crystaled underbase as described herein tends to hold the smaller crystaled upper layers in a far better manner than earlier artificial surfaces upon which winter sports were performed. During use, the surface material in the second layer may tend to move down the slope as use occurs. Although this movement down the slope is not as pronounced as in the other artificial surfaces explained in the Background of the Invention, it may nevertheless require repositioning of the material on the slope if the surfaces is used on a slope. Since the anti-friction agent has been applied to several layers of the smaller crystalled upper material, it generally suffices to reposition the smaller crystals on the slope. However, subsequent applications having more anti-friction agent may be appropriate.

The anti-friction material has been found to reduce the tendency of the smaller crystal material to clump together because of moisture absorption. As a result the surface takes on characteristics of "corn snow".

It may also be appropriate, when using this type of surface outdoors, to provide some sort of cover should precipitation occur. Although corrosion is a possibility, proper selection of sporting equipment can materially decrease this effect. Similarly, proper construction of the "run" can prevent a large share of the sodium chloride from being lost. Finally, due to the relatively low cost of materials, it is not necessary to salvage the material for use in another area. In summary, the sodium chloride crystals, and the anti-friction agent, provide an aesthetically pleasing and economic winter sports surface.

A SECOND EMBODIMENT

In a second method, the second layer of relatively smaller sodium chloride crystals may be prepared with the anti-friction agent before application to the surface.

In this method, the relatively smaller sodium chloride crystals are placed in a tumbling machine wherein the anti-friction agent, after dilution, if it is to be diluted, is applied to the sodium chloride crystals as they are tumbled. In this method, care should be taken that the crystals are not broken or abraded away to a noticeably smaller size as this will shorten the life of the prepared crystal. It is appropriate in this instance, as it is in the earlier embodiment, to utilize kiln-dried sodium chloride crystals as the water acts as a carrier for the anti-friction agent and soaks into or impregnates the crystal. The water is believed to become part of the water of hydration of the crystal and the anti-friction agent is believed carried throughout the crystal lattice. Then, upon breakage of the crystal during the tumbling or during use, any anti-friction agent which may have been drawn into the crystal with water acts on the fresh surface even though the crystal has broken. It is believed that the anti-friction agent acts along the surfaces of the crystals to assist in maintaining the crystals in discrete form. Experience has shown that application of the anti-friction agent in this manner provides a better material on which to perform winter sports.

It is preferred that sufficient of the anti-friction agent be utilized so as to impregnate substantially each crystal, both along the macroscopic surfaces as well as about the macroscopic crystalline lattice structure of the crystals. Where, for example, sodium chloride is the crystal material and dimethyl silicone fluid is the anti-friction agent, the anti-friction agent should be an aqueous solution of about 3 weight percent to about 40 weight percent dimethyl silicone wherein at least about 20–25 gallons (0.075–0.095M$^3$) of this solution is tumbled with 500 pounds (about 225 kilograms) of sodium chloride crystals.

Although this invention has been described utilizing sodium chloride crystals, other relatively hard crystal which would absorb moisture from the atmosphere could be used in place of the sodium chloride crystals. Similarly, other anti-friction agents which are either water soluble or water dilutable to enhance absorption into the crystalline structure utilized as a base may also be appropriately used.

Although this invention has been described in relation to two methods, other methods which do not depart from the scope and content of the description herein are also considered within the purview of this invention.

What is claimed is:
1. A method of preparing a surface for use in winter sports comprising the steps of:
   (a) laying down a first layer consisting of salt crystals capable of absorbing moisture on a surface;
   (b) permitting the layer set down in step (a) to absorb ambient moisture for a predetermined period of time to cement the salt crystals together;
   (c) the laying down of second coating layer consisting essentially of salt crystals capable of absorbing moisture and a relatively small amount of anti-friction agent, said second coating layer applied on top of the first layer.

2. The method of claim 1 further comprising the step of:
   providing kiln-dried sodium chloride crystals to act as the salt.

3. The method of claim 2 further comprising the steps of:
   providing a water dilutable emulsified silicone solution to act as the anti-friction agent.

4. The method of claim 3 wherein the step of providing the silicone solution includes the step of diluting the emulsified silicone solution with water.

5. The method of claim 1 further comprising the step of providing sodium chloride crystals to act as a salt and wherein the step of laying down the second layer of sodium chloride crystals comprises the steps of:
    laying down the second layer of sodium chloride crystals;
    spraying the surface of the second layer of sodium chloride crystals with the anti-friction agent.

6. The method of claim 5 wherein the step of spraying comprises the steps of:
    providing a water dilutable emulsified silicone solution;
    spraying the water dilutable emulsified silicone solution on the second layer of sodium chloride crystals.

7. The method of claim 1 further comprising the step of providing sodium chloride crystals to act as a salt and wherein the step of laying down the second layer of sodium chloride crystals comprises the steps of:
    mixing the anti-friction material with the sodium chloride crystals; and
    laying down the sodium chloride crystals with the anti-friction material mixed therein.

8. The method of claim 7 wherein the step of mixing comprises the steps of:
    providing a water dilutable emulsified silicone solution;
    mixing the silicone solution with the sodium chloride crystals.

9. The method of claim 6 or 8 wherein the step of providing sodium chloride crystals includes the step of providing kiln-dried sodium chloride crystals.

10. The method of claim 6 or 8 further comprising the steps of:
    providing relatively large kiln-dried sodium chloride crystals for the first layer and;
    providing relatively small kiln-dried sodium chloride crystals for the second layer.

11. A composition of matter useful for providing a winter sports surface, comprising:
    a plurality of sodium chloride crystals; and
    an aqueous solution of dimethyl silicone, the solution impregnated upon the crystal surfaces and about the crystal lattice structure of substantially each sodium chloride crystal.

12. The composition of matter as in claim 11 wherein:
    the solution comprises about 3 to about 40 weight percent dimethyl silicone.

* * * * *